July 25, 1944.     P. M. GILFILLAN ET AL     2,354,590
CONTAINER AND METHOD OF MANUFACTURE
Original Filed May 10, 1939

INVENTORS
Paul M. Gilfillan,
Irving Gurwick,
BY
Cromwell, Greist + Warden
ATTYS

Patented July 25, 1944

2,354,590

UNITED STATES PATENT OFFICE 2,354,590

CONTAINER AND METHOD OF MANUFACTURE

Paul M. Gilfillan and Irving Gurwick, Mount Vernon, Ohio, assignors to Shellmar Products Company, Mount Vernon, Ohio, a corporation of Delaware Original application May 10, 1939, Serial No. 272,860. Divided and this application January 10, 1941, Serial No. 373,966

9 Claims. (Cl. 93—35)

The present invention relates to an improved type of container for packaging food products and the like and to the method of forming the container and loading products therein, this application constituting a division of our copending application Serial No. 272,860, filed May 10, 1939.

A principal object of the invention is the formation of an improved type of bag or container for the packaging of food products and the like, in which the bag is constructed of at least two layers of transparent rubber hydrochloride, the inner layer being substantially unplasticized and the outer layer being plasticized sufficiently to provide the desired stability for the container.

Another object of the invention is the provision of a container of the type suitable for packaging pickles and the like, in which advantage is taken of combined characteristics of two different types of rubber halide material.

These and other objects will be evident upon a consideration of the following description of a preferred embodiment of the invention and by reference to the accompanying drawing, in which Fig. 1 is a diagrammatic view showing the method of forming the improved duplex material from which the container is produced;

In the packaging of food products considerable difficulty has been encountered in providing a suitable liquid-tight container. The product known as "Pliofilm," which consists of transparent rubber hydrochloride, has met with considerable favor in the formation of packages, but where the product is edible the ordinary type of transparent rubber hydrochloride cannot satisfactorily be employed. The present invention relates to an improved type of package in which many of the problems previously confronted by the art are solved.

Figure 1:
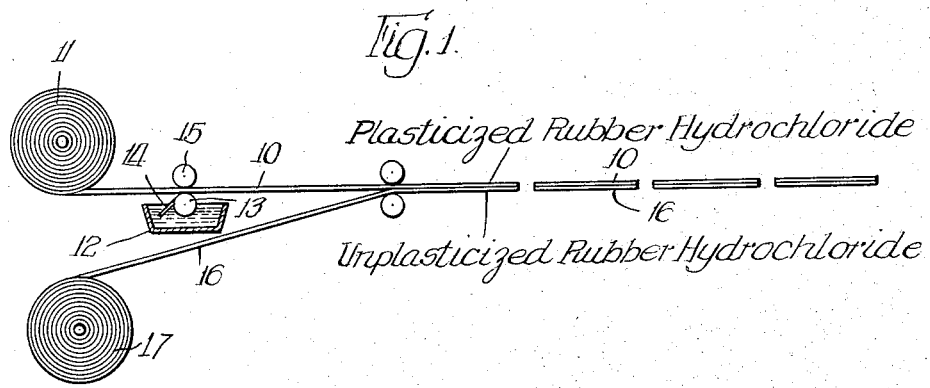

In producing the improved package an initial step consists of laminating a sheet of plasticized rubber hydrochloride with a web of unplasticized rubber hydrochloride. This operation is illustrated in Fig. 1, where the web 10 of plasticized rubber hydrochloride is taken from roll 11 and passed through an intaglio unit which deposits an overall coating of adhesive on the underside of the web. This intaglio unit consists of a bath 12 in which rotates an overall etched cylinder 13. The excess quantities of adhesive which are picked up by the cylinder 13 from the bath 12 are removed by the conventional doctor blade 14. An impression cylinder 15 is mounted above the adhesive-applying cylinder 13 and the web 10 passes between these rolls in the usual manner.

It is preferred to employ an adhesive which has a rubber base in the bath 12.

The web 10 passes from the intaglio unit to be adhered in overall relation with a web 16 of unplasticized rubber hydrochloride taken from the roll 17.

The composite web formed in the manner described then is cut into rectangular sections as shown in Fig. 1.

The next step in the operation of forming the pickle container consists in producing an inner container from two of the blanks produced as shown in Fig. 1. Each of the blanks is of elongated construction and shaped to form one-half of a bag or envelope which is to enclose a large, jumbo type pickle. In producing the inner unit two of the blanks are placed together with the sheets 16 constituting the inner layers and the sheets 10 constituting the outer layers. Thus, the sheets 16 are in face-to-face relation. It will be seen that since the blanks are of the same size each assembled unit will consist of four sheets, the edges of which on each side of the units are in the same plane. A plurality of such units then are stacked together in the manner shown in Fig. 2, a sheet of paper 18 or other insulating material of the same size as the units being placed between adjacent units. The result of this operation will be a stack of assembled units, each of which contains four abutting sheets. Since all of the sheets of each unit are of the same size the edges of the various units will be in the same plane and all four of the edges of each unit will touch but each unit will be insulated from the next adjacent unit.

After stacking the assembled units in the manner described, a hot plate 19 is brought into contact with the edges of the sheets on three sides of the units. The temperature of the hot plate 19 is sufficiently high to melt the edges of the sheets so that in each unit the edges of the four sheets will be bonded together. This bulk sealing method of producing the containers is highly satisfactory and it avoids the necessity of applying pressure to the edges, as is customary in unit-sealing devices. The plate 19 may be maintained in contact with the edges of the sheets for a sufficient time to provide an effective seal between the sheets of each unit. The particular temperature of the plate and the time of contact with the sheets may vary considerably, as will be understood, and the two factors are of course related to each other. In one desirable embodiment of the invention a single hot plate is employed and the plate is contacted with the stack on three sides successively. In this way containers of any desired shape or size may be produced and a large number of the containers are produced during the same operation and time interval.

Figures 2, 3:
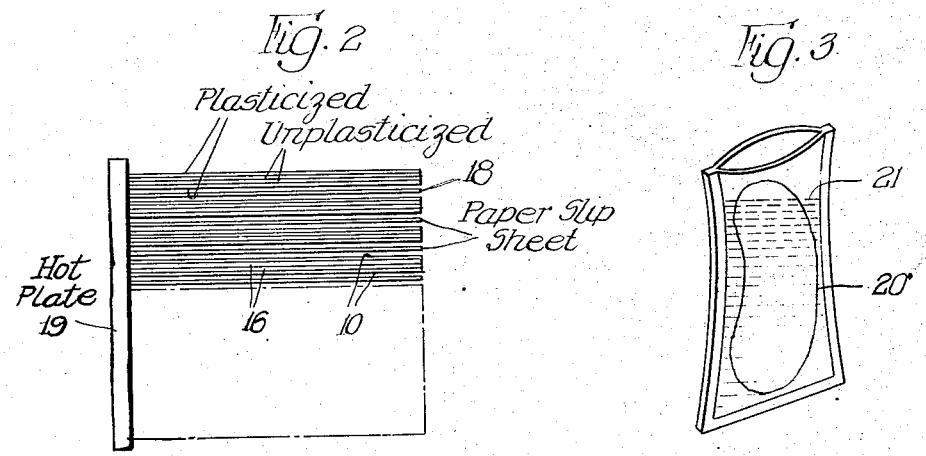
Fig. 2 is a view showing the method of sealing the edges of the container blanks together into bag form.
Fig. 3 is a view showing a bag constructed in the manner shown in Figs. 1 and 2 and loaded with a pickle and brine.

The envelope or bag which results from the operation shown in Fig. 2 is of the construction shown in Fig. 3. This bag consists of outer protective layers of rubber hydrochloride containing a sufficient quantity of a plasticizer to resist damage such as is apt to occur in cold weather. On the inside of the bag are adjacent layers of unplasticized rubber hydrochloride. The unplasticized rubber hydrochloride is more desirable to be kept in contact with the food product than is plasticized rubber hydrochloride, but the latter type of material is more satisfactory as an outer protective layer for the package.

A single pickle 30 is shown as being contained in the bag in Fig. 3 and after loading the pickle in the bag a quantity of brine indicated at 21 is poured into the bag about the pickle. It is preferred to prevent contact of the pickle in the brine with the upper edges of the bag during the loading operation.

Figure 4:
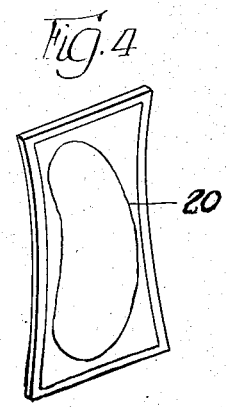
Fig. 4 is a view showing the bag of Fig. 3 in sealed condition.

After loading the pickle and brine in the bag, as shown in Fig. 3, the upper edges of the bag are brought together and individually sealed by the application of heat to produce the liquid-tight container shown in Fig. 4. The laminated construction of the rubber hydrochloride bag is considerably stronger than an unlaminated bag of similar form and weight of material. By combining the two types of material, strength and protective characteristics are obtained.

By employing an unplasticized or substantially unplasticized inner layer of rubber hydrochloride, the possibility of dissolution of plastic plasticizers from the container by the food product is avoided.

The particular process as used in the outer rubber hydrochloride sheet will vary in accordance with conventional practice. In general, all of these plasticizers are undesirable in food products. When the outer plasticized sheet is placed adjacent the inner unplasticized sheet there appears to be a slight impregnation of the outer surface portions of the inner sheets by a very small amount of the plasticizer. However, the plasticizer does not work its way through the inner sheet to the food product.

The adhesive material employed in securing the inner and outer sheets of material together may vary widely. The usual rubber adhesives may be used for this purpose. A solution of transparent rubber hydrochloride itself is likewise suitable. In some instances it will be desirable to reduce the area of lamination of the two sheets somewhat. Thus, the adhesive by which the two sheets are secured together may cover considerably less than the total surface of the interface areas. One alternative method of securing the sheets together consists in bringing together complementary blanks or halves of the package without lamination and securement of the four sheets together in the manner described herein.

It is desirable to employ a container which has a white interior since the light-reflective surface gives better vision of the article viewed through the opposite transparent rubber hydrochloride sheet. In such an embodiment of the invention one of the outer transparent plasticized rubber hydrochloride pellicles of the container is replaced by white paper which is laminated to the interior unplasticized layer of transparent rubber hydrochloride. This latter embodiment has the advantage of eliminating the necessity for using the paper slip sheet 18, because when the blanks are stacked together for bulk-sealing the outer paper layer will itself act as an insulating and facing medium between adjacent containers during the sealing operation. The paper backing also imparts rigidity and strength to the inner container and improves the visibility of the product by its light-reflective characteristics.

Various changes may be made in the container and the method of its formation without departing from the invention as defined in the appended claims.

We claim:

1. The method of forming containers, which comprises adhesively laminating in overall relation a sheet of plasticized transparent rubber hydrochloride to a sheet of unplasticized rubber hydrochloride, placing a section of the laminated material together with a section having an inner unplasticized layer and an outer protective paper layer so that the unplasticized portions thereof are in contact and the plasticized portion and paper layer constitute outside layers, and heat-sealing the edges of the materials.

2. A container comprising inner layers of unplasticized transparent rubber material and outer layers of protective material adhesively laminated to said unplasticized layer including on one side a sheet of plasticized transparent rubber material, the marginal portions of said materials being thermally sealed on a plurality of sides.

3. A container comprising inner layers of unplasticized rubber hydrochloride and outer layers of plasticized rubber hydrochloride adhesively laminated to said inner layers, the adjacent marginal portions on a plurality of sides of said container being thermally united.

4. A method of forming containers, which comprises assembling in alternate superimposed relation a stack of composite blanks, one of said composite blanks consisting of a layer of an unplasticized rubber hydrochloride and an outer layer of paper, and the other composite blank consisting of a layer of unplasticized rubber hydrochloride and an outer layer of plasticized rubber hydrochloride, said blanks being so arranged that the unplasticized layers are in face-to-face relationship with each other, and simultaneously heat-sealing adjacent edges of the rubber hydrochloride layers of each of said composite blanks so that contacting marginal edges of said materials including said paper are bonded together to form said container.

5. A container comprising inner sheets of an unplasticized heat-sealable material and outer sheets of protective materials forming walls for said container, at least one of said walls including sheet of plasticized heat-sealable material and the other of said walls including a sheet of paper, the marginal portions of said heat-sealable materials being thermally bonded together including said paper on a plurality of sides leaving an opening for filling said containers, said opening being adapted thermally to be sealed thereafter to provide a closure for said container.

6. A double wall container, both walls being composed essentially of rubber hydrochoride, the outer wall being plasticized to increase its strength and the inner wall being unplasticized.

7. A double wall bag formed of two pieces of rubber hydrochloride film, the bottom of the inner bag being formed by coalescence of the contacting portions of the bottom of the inner wall, the compositon of the films forming the inner and outer walls being distinguished by the fact that the outer wall contains plasticizer which strengthens the film.

8. A double wall bag with the inner and outer walls each formed of a single sheet of rubber hydrochloride, the long seams of each wall being formed by coalescence of the rubber hydrochoride, the bottom being formed by coalescence of the rubber hydrochloride on opposite sides thereof, the outer wall being united to the inner wall by coalescence of the rubber hydrochloride in the two walls at the bottom thereof, the composition of the two walls being differentiated by the presence of plasticizer in the outer wall and the absence of plasticizer in the inner wall.

9. A food package which comprises an outer bag of rubber hydrochloride film which contains plasticizer which strengthens the film and between this outer film and the food-stuff in the bag a protective barrier of unplasticized rubber hydrochloride.

PAUL M. GILFILLAN.
IRVING GURWICK.